US012299410B2

(12) United States Patent
Adir et al.

(10) Patent No.: US 12,299,410 B2
(45) Date of Patent: May 13, 2025

(54) STRING SIMILARITY BASED WEIGHTED MIN-HASHING

(71) Applicant: International Business Machines Corporation, Armonk, NY (US)

(72) Inventors: Allon Adir, Kiryat Tivon (IL); Ehud Aharoni, Kfar Saba (IL); Omri Soceanu, Haifa (IL); Michael Mirkin, Tivon (IL)

(73) Assignee: International Business Machines Corporation, Armonk, NY (US)

( * ) Notice: Subject to any disclaimer, the term of this patent is extended or adjusted under 35 U.S.C. 154(b) by 126 days.

(21) Appl. No.: 17/853,996

(22) Filed: Jun. 30, 2022

(65) Prior Publication Data

US 2024/0004610 A1 Jan. 4, 2024

(51) Int. Cl.
*G06F 16/90* (2019.01)
*G06F 7/02* (2006.01)
*G06F 16/14* (2019.01)
*G06F 16/31* (2019.01)
(Continued)

(52) U.S. Cl.
CPC .............. *G06F 7/02* (2013.01); *G06F 16/152* (2019.01); *G06F 16/313* (2019.01); *G06F 16/90344* (2019.01); *G06F 16/2458* (2019.01)

(58) Field of Classification Search
CPC .... G06F 7/02; G06F 16/313; G06F 16/90344; G06F 16/152; G06F 16/2458
See application file for complete search history.

(56) References Cited

U.S. PATENT DOCUMENTS 5,200,999 A * 4/1993 Matyas ............... G06F 9/30007
712/E9.032
6,307,938 B1 * 10/2001 Matyas, Jr. ........... H04L 9/3033
380/46
(Continued)

FOREIGN PATENT DOCUMENTS

CN 105677661 A 6/2016
CN 112099725 A 12/2020
(Continued)

OTHER PUBLICATIONS

"IBM InfoSphere Optim Test Data Fabrication", IBM, downloaded from the Internet on Apr. 12, 2022, 7 pages, <https://www.ibm.com/products/infosphere-optim-test-data-fabrication>.
(Continued)

*Primary Examiner* — Daniel A Kuddus
(74) *Attorney, Agent, or Firm* — David K. Mattheis

(57) ABSTRACT

A computer-implemented method for generating hash values to determine string similarity is disclosed. The computer-implemented method includes converting a first text string of a first data set into a first set of shingles. The computer-implemented method further includes determining a weight associated with each shingle in the first set of shingles based, at least in part, on a particular record field associated with a shingle. The computer-implemented method further includes generating, based on a hash function, a hash value for each shingle in the first set of shingles. The computer-implemented method further includes reducing the hash value generated for each shingle in the first set of shingles, based, at least in part on the weight associated with the shingle.

20 Claims, 6 Drawing Sheets

(51) Int. Cl.
  *G06F 16/903* (2019.01)
  *G06F 16/2458* (2019.01)

(56) References Cited

U.S. PATENT DOCUMENTS

| | | | | |
|---|---|---|---|---|
| 7,151,829 | B2* | 12/2006 | Condorelli | H04L 9/0643 |
| | | | | 713/180 |
| 7,617,231 | B2* | 11/2009 | Moon | H04L 9/3236 |
| | | | | 707/999.102 |
| 9,158,925 | B2 | 10/2015 | Kamara | |
| 9,275,237 | B2 | 3/2016 | De Cristofaro | |
| 9,686,283 | B2* | 6/2017 | Hunt | H04L 63/1416 |
| 9,942,032 | B1 | 4/2018 | Kornaropoulos et al. | |
| 9,984,176 | B2* | 5/2018 | Ueda | G06F 16/9014 |
| 10,341,103 | B2 | 7/2019 | Shaked | |
| 10,757,101 | B2* | 8/2020 | Hunt | G06F 21/128 |
| 11,061,874 | B1 | 7/2021 | Funk et al. | |
| 2003/0198342 | A1* | 10/2003 | Condorelli | H04L 9/0643 |
| | | | | 380/37 |
| 2006/0101069 | A1* | 5/2006 | Bell | G06F 40/30 |
| 2007/0130188 | A1* | 6/2007 | Moon | H04L 9/3236 |
| 2008/0071852 | A1* | 3/2008 | Haller | G06F 7/507 |
| | | | | 708/700 |
| 2009/0132669 | A1* | 5/2009 | Milliken | H04L 63/145 |
| | | | | 709/206 |
| 2010/0189409 | A1 | 7/2010 | Brasnett et al. | |
| 2015/0010143 | A1* | 1/2015 | Yang | G06F 3/068 |
| | | | | 380/28 |
| 2015/0098660 | A1* | 4/2015 | Ravid | G06F 40/194 |
| | | | | 382/219 |
| 2016/0019232 | A1 | 1/2016 | Lambright | |
| 2016/0077977 | A1 | 3/2016 | Narayanamurthy | |
| 2016/0182234 | A1* | 6/2016 | Ueda | G06F 16/9014 |
| | | | | 380/28 |
| 2017/0060866 | A1* | 3/2017 | Rudy | G06F 16/2255 |
| 2017/0286544 | A1* | 10/2017 | Hunt | H04L 63/123 |
| 2018/0075090 | A1* | 3/2018 | Knight | G06F 16/24 |
| 2019/0354574 | A1 | 11/2019 | Wick et al. | |
| 2019/0378599 | A1 | 12/2019 | Amisano et al. | |
| 2021/0240841 | A1 | 8/2021 | Nicolas | |
| 2021/0397350 | A1 | 12/2021 | Luo et al. | |
| 2022/0004654 | A1 | 1/2022 | Patel et al. | |
| 2023/0315883 | A1* | 10/2023 | Adir | G06F 21/6218 |
| | | | | 726/26 |

FOREIGN PATENT DOCUMENTS

| | | | |
|---|---|---|---|
| CN | 114418014 A | | 4/2022 |
| EP | 3201782 | * | 8/2017 |

OTHER PUBLICATIONS

Baker et al., "Privacy-Preserving Linkage of Genomic and Clinical Data Sets", IEEE/ACM Transactions on Computational Biology and Bioinformatics, vol. 16, No. 4, Jul./Aug. 2019, pp. 1342-1348.

Barker et al., "Recommendation for Pair-Wise Key-Establishment Schemes Using Integer Factorization Cryptography", Draft NIST Special Publication 800-56B, Revision 1, Mar. 2014, NIST, U.S. Department of Commerce, 132 pages.

Carter et al., "Universal Classes of Hash Functions", Journal of Computer and System Sciences, 18, pp. 143-154 (1979).

Chen et al., "Fast Private Set Intersection from Homomorphic Encryption", In: Proceedings of the 2017 ACM SIGSAC Conference on Computer and Communications Security, pp. 1243-1255, CCS '17, Association for Computing Machinery, New York, NY, USA (2017).

Chen et al., "Labeled PSI from Fully Homomorphic Encryption with Malicious Security", In: Proceedings of the 2018 ACM SIGSAC Conference on Computer and Communications Security, pp. 1223-1237, CCS '18, Association for Computing Machinery, New York, NY, USA (2018).

Chen et al., "Perfectly Secure and Efficient Two-Party Electronic-Health-Record Linkage", IEEE Internet Computing, Mar.-Apr. 2018;22(2): 32-41, Published online Jan. 16, 2018, doi: 10.1109/MIC.2018.112102542.

Chen, Yanling, "Current approaches and challenges for the two-party privacy-preserving record linkage (PPRL)", Collaborative Technologies and Data Science in Artificial Intelligence Applications pp. 108-116 (2020).

Christen et al., "Efficient Cryptanalysis of Bloom Filters for Privacy-Preserving Record Linkage", Advances in Knowledge Discovery and Data Mining. pp. 628-640. Springer International Publishing, Cham (2017).

Christen et al., "Precise and Fast Cryptanalysis for Bloom Filter Based Privacy-Preserving Record Linkage", IEEE Transactions on Knowledge and Data Engineering, vol. 31, No. 11, Nov. 2019, pp. 2164-2177.

Churches et al., "Blind data linkage using n-gram similarity comparisons", In: Advances in Knowledge Discovery and Data Mining. pp. 121-126. Springer Berlin Heidelberg, Berlin, Heidelberg (2004).

Clifton et al., "Privacy-Preserving Data Integration and Sharing", DMKD '04, Jun. 13, 2004, Paris, France, 9 pages.

Cong et al., "Labeled PSI from Homomorphic Encryption with Reduced Computation and Communication", In: Proceedings of the 2021 ACM SIGSAC Conference on Computer and Communications Security, 27 pages, CCS '21, Association for Computing Machinery, New York, NY, USA (2021).

Cui et al., "A Not-So-Trival Replay Attack Against DH-PSI", Jul. 18, 2020, Cryptology ePrint Archive, Report 2020/901 (2020), 3 pages.

Essex, Aleksander, "Secure Approximate String Matching for Privacy-preserving Record Linkage", IEEE Transactions on Information Forensics and Security (TIFS), 14(10) 11 pages, 2019.

Franke et al., "Evaluation of Hardening Techniques for Privacy-Preserving Record Linkage", Published in Proceedings of the 24th International Conference on Extending Database Technology (EDBT), Mar. 23-26, 2021,12 pages.

Franke et al., "Parallel Privacy-preserving Record Linkage using LSH-based Blocking", In Proceedings of the 3rd International Conference on Internet of Things, Big Data and Security (IoTBDS 2018), pp. 195-203, DOI: 10.5220/0006682701950203.

Freeman, David, "Pairing-Based Identification Schemes", Cryptology ePrint Archive, Report 2005/336, Received Sep. 19, 2005, 18 pages.

Gkoulalas-Divanis et al., "Modern Privacy-Preserving Record Linkage Techniques: An Overview", IEEE Transactions on Information Forensics and Security, vol. 16, 2021, pp. 4966-4987.

He et al., "Composing Differential Privacy and Secure Computation: A case study on scaling private record linkage", CCS'17, Oct. 30-Nov. 3, 2017, Dallas, TX, USA, pp. 1389-1406, <https://doi.org/10.1145/3133956.3134030>.

Huberman et al., "Enhancing Privacy and Trust in Electronic Communities", In: Proceedings of the 1st ACM Conference on Electronic Commerce, 9 pages, EC '99, Association for Computing Machinery, NY, USA (1999).

Ioffe, Sergey, "Improved Consistent Sampling, Weighted Minhash and L1 Sketching", 2010 IEEE International Conference on Data Mining, 10 pages, DOI 10.1109/ICDM.2010.80.

Karapiperis et al., "A Distributed Near-Optimal LSH-based Framework for Privacy-Preserving Record Linkage", Computer Science and Information Systems 11(2):745-763 DOI: 10.2298/CSIS140215040K, (2014).

Kargupta et al., "Random-data perturbation techniques and privacy-preserving data mining", Knowledge and Information Systems 7(4), 387-414 (May 2005).

Khurram et al., "SFour: A Protocol for Cryptographically Secure Record Linkage at Scale", 2020 IEEE 36th International Conference on Data Engineering (ICDE), 12 pages, DOI 10.1109/ICDE48307.2020.00031.

Kroll et al., "Automated Cryptanalysis of Bloom Filter Encryptions of Health Records", In Proceedings of the International Conference on Health Informatics (Healthinf-2015), pp. 5-13, DOI:10.5220/0005176000050013.

(56) References Cited

OTHER PUBLICATIONS

Kuzu et al., "A Constraint Satisfaction Cryptanalysis of Bloom Filters in Private Record Linkage", PETS 2011, LNCS 6794, pp. 226-245, 2011.
Leskovec et al., "Finding Similar Items (Chapter 3)—Mining of Massive Datasets", Published online by Cambridge University Press: Dec. 5, 2014, 4 pages.
Meadows, Catherine, "A more efficient cryptographic matchmaking protocol for use in the absence of a continuously available third party", In: 1986 IEEE Symposium on Security and Privacy. pp. 134-134 (1986).
Mullaymeri, et al., "A Two-Party Private String Matching Fuzzy Vault Scheme", SAC '21, Mar. 22-26, 2021, Virtual Event, Republic of Korea, pp. 340-343, <https://doi.org/10.1145/3412841.3442079>.
Pinkas et al., "Faster Private Set Intersection Based on OT Extension", USENIX, This paper is included in the Proceedings of the 23rd USENIX Security Symposium, Aug. 20-22, 2014 • San Diego, CA, 17 pages.
Rao et al., "Hybrid Private Record Linkage: Separating Differentially Private Synopses from Matching Records", ACM Transactions on Privacy and Security, vol. 22, No. 3, Article 15. Publication date: Apr. 2019, 36 pages, https://doi.org/10.1145/3318462.
Ravikumar et al., "A secure protocol for computing string distance metrics", PSDM held at ICDM (2004), 7 pages.
Saleem et al., "Recent advancements in garbled computing: How far have we come towards achieving secure, efficient and reusable garbled circuits", Journal of Network and Computer Applications, 108 (2018) pp. 1-19, <https://doi.org/10.1016/j.jnca.2018.02.006>.
Schnell et al., "Privacy-preserving record linkage using Bloom filters", BMC Medical Informatics and Decision Making 2009, 9:41, doi: 10.1186/1472-6947-9-41, Published Aug. 25, 2009, 11 pages.
Vatsalan et al., "Privacy-Preserving Record Linkage for Big Data: Current Approaches and Research Challenges", Chapter 7, Feb. 2017, Handbook of Big Data Technologies, DOI 10.1007/978-3-319-49340-4_25, 46 pages.
Wong et al., "Privacy-preserving similarity coefficients for binary data", Computers and Mathematics with Applications 65, pp. 1280-1290 (2013), doi:10.1016/j.camwa.2012.02.028.
Adir et al., "Method to Privately Determine Data Intersection", U.S. Appl. No. 17/707,099, filed Mar. 29, 2022.
List of IBM Patents or Patent Applications Treated as Related, Filed Jul. 5, 2022, 2 pages.
"Weighted MinHash", downloaded from the Internet on Apr. 28, 2022, 2 pages, <http://ekzhu.com/datasketch/weightedminhash.html>.
Authors Disclosed Anonymously, "Privacy-preserving record linkage using local sensitive hash and private set intersection", submitted Mar. 21, 2022 in preparation for Cloud S&P 2022, 4th Workshop on Cloud Security & Privacy to be held Jun. 20-23, 2022, Rome Italy, 26 pages, Grace Period Disclosure Document.
Chmielewski et al., "Fuzzy Private Matching (Extended Abstract)", 2008 Third International Conference on Availability, Reliability and Security, Mar. 4-7, 2008, Date added to IEEE Xplore: May 23, 2008, DOI: 10.1109/ARES.2008.170, 9 pages.
Christiani et al., "Set Similarity Search Beyond MinHash", arXiv:1612.07710v2 [cs.DS] Apr. 18, 2017, 14 pages.
Ghosh, Supriya, "Text Similarity using K-Shingling, Minhashing and LSH (Locality Sensitive Hashing)", Oct. 29, 2021, 27 pages, <https://towardsai.net/p/l/text-similarity-using-k-shingling-minhashing-and-lshlocality-sensitive-hashing>.
Hasan, Rizvi, "Large scale document similarity search with LSH and MinHash", Mar. 19, 2020, 10 pages, <https://mrhasankthse.github.io/riz/2020/03/19/Minhash-and-LSH.html>.
Ioffe, Sergey, "Improved Consistent Sampling, Weighted Minhash and L1 Sketching". ICDM 2010, The 10th IEEE International Conference on Data Mining, Sydney, Australia, Dec. 14-17, 2010, 10 pages.
Karapiperis et al., "Federal: A Framework for Distance-Aware Privacy-Preserving Record Linkage", IEEE Transactions on Knowledge and Data Engineering, vol. 30, No. 2, Feb. 2018, 13 pages.
Mell et al., "The NIST Definition of Cloud Computing", Recommendations of the National Institute of Standards and Technology, NIST Special Publication 800-145, Sep. 2011, 7 pages.
Papadakis et al., "Blocking and Filtering Techniques for Entity Resolution: A Survey", 2020, ACM Comput. Surv. 53, 2, Article 31 (Mar. 2020), 42 pages, https://doi.org/10.1145/3377455.
Titus et al., "SIG-DB: leveraging homomorphic encryption to Securely Interrogate privately held Genomic DataBases", provided by inventor in invention record dated Nov. 15, 2021, 38 pages, <https://arxiv.org/ftp/arxiv/papers/1803/1803.09565.pdf>.
Yao et al., "AMPPERE: A Universal Abstract Machine for Privacy-Preserving Entity Resolution Evaluation", arXiv:2108.09879v2 [cs.CR] Aug. 24, 2021, CIKM '21, Nov. 1-5, 2021, Virtual Event, QLD, Australia, <https://doi.org/10.1145/3459637.3482318>, 10 pages.
IBM Appendix P., List of IBM Patents or Patent Applications Treated as Related, Dated Herewith 2 pages.

\* cited by examiner

STRING SIMILARITY BASED WEIGHTED MIN-HASHING

STATEMENT REGARDING PRIOR DISCLOSURES BY THE INVENTOR OR JOINT INVENTOR

The following disclosure is submitted under 35 U.S.C. 102(b)(1)(A):

The invention was publicly disclosed on Jul. 29, 2021. Further, AUTHORS DISCLOSED ANONYMOUSLY, "Privacy-preserving record linkage using local sensitive hash and private set intersection", submitted Mar. 21, 2022 in preparation for Cloud S&P 2022, 4th Workshop on Cloud Security & Privacy held 20-23 Jun. 2022, Rome Italy.

BACKGROUND

The present invention relates generally to the field of private set intersection, and more particularly to, optimizing measuring string similarity by weighting shingles for min-hashing.

Privacy Preserving Record Linkage (PPRL) matches records while preserving each parties privacy allowing the combination of data from different sources for improved data analysis and research. Entity resolution (ER) methods try to detect cases where the same entity is represented in different data records. For example, "deduplication" identifies duplicate pairs/sets of records within the same database, whereas "record-linkage" (RL)—the focus of this disclosure, identifies pairs/sets of records in two databases that refer to the same entity. ER must take into account that the different representations of the same entity may differ slightly, due to various causes, such as typos, omissions, different styles, different word ordering, etc.

Private set intersection (PSI) allows one or more parties to compute the intersection of data without exposing the non-intersecting data to another party. In other words, PSI allows to test whether the parties share a common datapoint (such as a location, ID, etc). Locality-sensitive hashing (LSH) is an algorithmic technique that hashes similar input items into the same "buckets" with high probability. Since similar items end up in the same buckets, this technique can be used for data clustering and nearest neighbor search.

SUMMARY

According to one embodiment of the present invention, a computer-implemented method for generating hash values to determine string similarity is disclosed. The computer-implemented method includes converting a first text string of a first data set into a first set of shingles. The computer-implemented method further includes determining a weight associated with each shingle in the first set of shingles based, at least in part, on a particular record field associated with a shingle. The computer-implemented method further includes generating, based on a hash function, a hash value for each shingle in the first set of shingles. The computer-implemented method further includes reducing the hash value generated for each shingle in the first set of shingles, based, at least in part on the weight associated with the shingle.

According to another embodiment of the present invention, a computer program product for generating hash values to determine string similarity is disclosed. The computer program product includes one or more computer readable storage media and program instructions stored on the one or more computer readable storage media. The program instructions include instructions to convert a first text string of a first data set into a first set of shingles. The program instructions further include instructions to determine a weight associated with each shingle in the first set of shingles based, at least in part, on a particular record field associated with a shingle. The program instructions further include instructions to generate, based on a hash function, a hash value for each shingle in the first set of shingles. The program instructions further include instructions to reduce the hash value generated for each shingle in the first set of shingles, based, at least in part on the weight associated with the shingle.

According to another embodiment of the present invention, a computer system for generating hash values to determine string similarity is disclosed. The computer system includes one or more computer processors, one or more computer readable storage media, and computer program instructions, the computer program instructions being stored on the one or more computer readable storage media for execution by the one or more computer processors. The program instructions include instructions to convert a first text string of a first data set into a first set of shingles. The program instructions further include instructions to determine a weight associated with each shingle in the first set of shingles based, at least in part, on a particular record field associated with a shingle. The program instructions further include instructions to generate, based on a hash function, a hash value for each shingle in the first set of shingles. The program instructions further include instructions to reduce the hash value generated for each shingle in the first set of shingles, based, at least in part on the weight associated with the shingle.

BRIEF DESCRIPTION OF DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
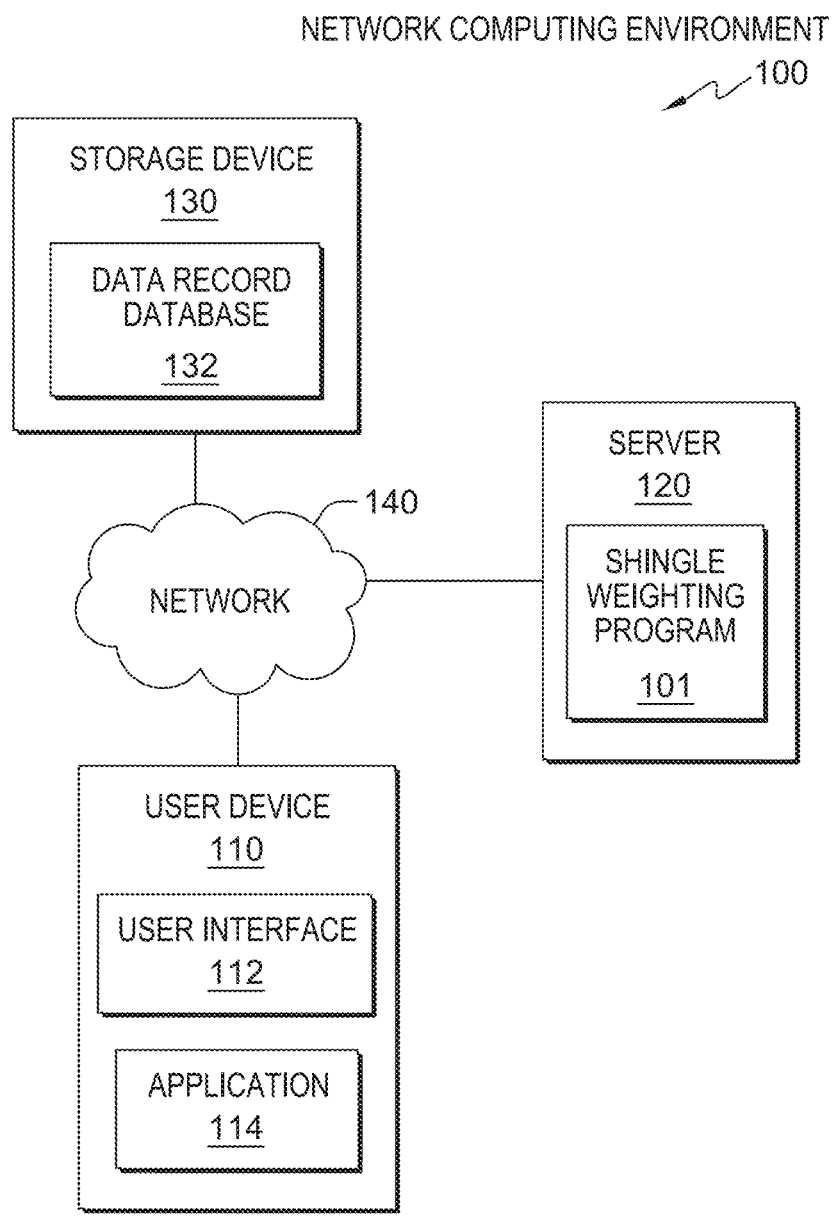
FIG. 1 is a block diagram of a network computing environment for shingle weighting program 101, generally designated 100, in accordance with at least one embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The present invention relates generally to the field of private set intersection, and more particularly to, optimizing measuring string similarity by weighting shingles for min-hashing.

Recently, as the awareness for privacy increases and new regulations are enforced, there is a growing need for privacy preserving Entity-Resolution, and in particular, privacy preserving Record-Linkage (PPRL). For example, in the case where two companies need to learn their common clients or the number of such common clients, they typically cannot conduct such intersections openly, because this would reveal too much information to the other side or to eavesdroppers. The main challenge is due to the fact that similar records between different clients may differ slightly (e.g., due to various causes, such as typos, omissions, different styles, or different word ordering), and thus may go unmatched during the record intersection process. Unfortunately, few practical protocols exist that securely perform such "fuzzy" record linkage without revealing some private data of the parties, and that can do so within a reasonable time even for very large sets of data. The use of trusted third party may be a part of the solution, but is oftentimes undesirable, as it may introduce further security/privacy issues, and is thus circumvented by the present invention.

There are several commonly used metrics for measuring the similarity of strings such as Levenshtein distance or Jaccard Similarity coefficient. Measuring string similarity is very useful in a variety of use cases, such as Record-Linkage where different database records are compared to assess the possibility that they refer to the same entity. In the case of Record-Linkage, many strings coming from two large sets of strings need to be compared, so comparing all possible pairs of strings would involve too many comparisons. Therefore, the common solution is to create a "local-sensitive-hash" (LSH) for every string in two databases (i.e., a hash that returns the same value for similar inputs) and then to index the LSHs to allow for fast comparison of the strings coming from the two datasets.

LSH used for such a comparison of a large set of strings relies on min-hashes (sub-strings of fixed length) over the set of "shingles" extracted from the compared string. A shingle is a contiguous list of characters from the string to be compared. For example, "et b" is a 4-shingle from the string "Sunset blvd 56 Los-Angeles". Every shingle is "hashed" by a random hash function that produces random numbers for input strings. For example, hash function H1 may output the hash value 23 for the four character shingle "et b", and the value 987 for the next four character shingle "t bl". This is repeated for all possible combinations of four consecutive character shingles, and then the minimum hash value of all of the shingles is taken as the min=hash signature of H1 for "Sunset blvd 56 Los-Angeles". Suppose that this minimal H1 value was 17 which was the H1 value for the 4-shingle "Ange". Here, 17 is the min-hash signature of H1 for the original string.

Several min-hashes are used to produce a tuple of signatures and strings are considered similar if their tuples share a common signature. However, some record fields may be more indicative of identity than other fields. For example, a Social-Security-Number field is a very indicative field (though it may also include errors), and a similarity of the full names is more indicative of identity than similarity of zip codes. Embodiments of the present invention recognize the need to let shingles extracted from some particular types of data or field (e.g., names) to have more effect when measuring string similarity than shingles extracted from other types of data (e.g., zip-codes). Accordingly, embodiments of the present invention improve measuring string similarly by providing for, and adjusting different weights to shingles used when comparing records for PPRL.

Embodiments of the present invention recognize the goal is to increase the probability that shingles that contain letters for the more indicative record field (e.g., SSN is more indicative than a city) will have a greater probability of ending up with the minimal hash value. For example, embodiments of the present invention duplicate shingles coming for "Sunset" from the address Sunset blvd 56 Los-Angeles. Here, instead of just the 4-shingles suns, unse, nset, set, et b, t bl, we can duplicate each of these shingles, say 3 times to get 12 shingles, in order to increase their chance of getting the minimum hash value by 3. For example, "et b" will be duplicated into "et b1", "et b2", "et b3" with H1 hash values 93, 5, 205. However, a problem with this solution is that these duplicate shingles now also need to undergo the standard computations—including computing the hash values, and later encrypting and communicating these encryptions.

Typically, the LSH of a string includes a tuple of signatures, each resulting from several Min-Hashes evaluated over all the shingles (sub-strings of fixed length) extracted from the string. A Min-Hash is evaluated by running some other underlying hash over all the shingles and returning the minimal result. One way to raise the effect of an "indicative" shingle, such as a shingle coming from the full name, is to duplicate the shingle before evaluating the Min-Hash. This increases the probability that the duplicated shingle will be the shingle that gives the minimal value for the underlying hash. However, the problem with this way of shingle duplication weighting is that the extra shingles slow down the Record-Linkage process, since more shingles need to be hashed by the large number of Min-Hashes. Embodiments of the present invention recognize a faster method for weighting the shingles is to reduce their hash value according to their weight to directly increase their chance of their being the shingles that receive the minimal value by the Min-Hashes. Embodiments of the present invention reduce the hash value in a way that precisely mimics the above shingle duplication approach, without incurring the cost of handling extra shingles.

Embodiments of the present invention recognize shingle duplication creates extra shingles and slows down the matching process since more shingles need to be hashed by the many min-hashes. Instead, embodiments of the present invention reduce hash values returned by the hash function according to their weight. Embodiments of the present invention recognize a shingle duplicated W times has W more chance of being hashed to the Min-Hash, thus increasing the chance that the band signatures are similar, and thus determined to be a match. For instance, a shingle duplicated W times is W times more likely of being hashed to the Min-Hash than a shingle not duplicated. A shingle can be efficiently weighted by reducing its hash value according to its weight so as to directly increase the chance that the shingle will receive the minimal value by the Min-Hashes. Embodiments of the present invention allow two users to compute the shingles, Min-Hashes and LSH and weighing the shingles by hash-dropping as described in our patent. Embodiments of the present invention reduce the hash value according to their weight. Thus, supporting real weights with no penalty for high weighted shingles, as with duplication, nor requiring to know the value range in advance. For example, if H1 returns the value 987 for the shingle "et b", we can increase the chance that "et b" will get the minimum value by directly reducing this value to say 900. This method is cheaper than duplicating the shingles because there is no "additional" cost of handling the duplicates.

In an embodiment, the method for generating hash values to determine string similarity includes converting a first text string of a first data set into a first set of shingles. In an embodiment, the method further includes determining a weight associated with each shingle in the first set of shingles based, at least in part, on a particular record field associated with a shingle. In an embodiment, the method further includes generating, based on a hash function, a hash value for each shingle in the first set of shingles. In an embodiment, the method further includes reducing the hash value generated for each shingle in the first set of shingles, based, at least in part, on the weight associated with the shingle.

In an embodiment, reducing the hash value generated for each shingle in the first set of shingles further includes generating a first intermediate value by dividing the hash value generated for the shingle by a maximum hash value. In an embodiment, reducing the hash value generated for each shingle in the first set of shingles further includes generating a second intermediate value by calculating 1 minus the first intermediate value raised to the weight associated with the shingle. In an embodiment, reducing the hash value generated for each shingle in the first set of shingles further includes generating a third intermediate value by multiplying the second intermediate value by the weight associated with the shingle. In an embodiment, reducing the hash value generated for each shingle in the first set of shingles further includes reducing the hash value generated for the shingle based on the third intermediate value.

In an embodiment, reducing the hash value generated for each shingle in the first set of shingles increases as the weight associated with the shingle increases. In an embodiment, reducing the hash value generated for each shingle in the first set of shingles decreases as the weight associated with the shingle increases.

In an embodiment, reducing the hash value of each shingle in the first set of shingles according to the weight associated with the shingle directly increases a likelihood of a shingle with a higher weight ending up with a minimum hash value.

In an embodiment, converting the text string into the set of shingles further includes dividing the first text string into a set of overlapping substrings having a fixed number of consecutive characters, wherein a total number of shingles in the first set of shingles is determined by a total number of different possible combinations overlapping substrings having the fixed number of consecutive characters.

In an embodiment, the method further includes computing a hash-based signature for the shingle having a minimum hash value. In an embodiment, the method further includes determining that the first text string from the first data set and a second text string from a second data set intersect based, at least in part, the first text string and the second text string sharing the hash-based signature. In an embodiment, the method further includes determining that the first text string from the first data set and the second text string from the second data set are a match based, at least in part, on a similarity score associated with the first and second text strings being above a predetermined threshold. In an embodiment, determining that the first text string from the first data set and the second text string from the second data set are a match is further based, at least in part, on a Jaccard similarity being above a predetermined threshold.

The present invention may be a system, a method, and/or a computer program product at any possible technical detail level of integration. The computer program product may include a computer readable storage medium (or media) having computer readable program instructions thereon for causing a processor to carry out aspects of the present.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suit-able combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention will now be described in detail with reference to the Figures. FIG. 1 is a functional block diagram of a network computing environment for shingle weighting program 101, generally designated 100, in accordance with at least one embodiment of the present invention. In an embodiment, network computing environment 100 may be provided by cloud computing environment 50, as depicted and described with reference to FIG. 5, in accordance with at least one embodiment of the present invention. FIG. 1 provides an illustration of only one implementation and does not imply any limitations with regard to the environments in which different embodiments may be implemented. Many modifications to the depicted environment may be made by those skilled in the art without departing from the scope of the present invention as recited by the claims.

Network computing environment 100 includes user device 110, server 120, and storage device 130 interconnected over network 140. User device 110 may represent a computing device of a user, such as a laptop computer, a tablet computer, a netbook computer, a personal computer, a desktop computer, a personal digital assistant (PDA), a smart phone, a wearable device (e.g., smart glasses, smart watches, e-textiles, AR headsets, etc.), or any programmable computer systems known in the art. In general, user device 110 can represent any programmable electronic device or combination of programmable electronic devices capable of executing machine readable program instructions and communicating with server 120, storage device 130 and other devices (not depicted) via a network, such as network 140. User device 110 can include internal and external hardware components, as depicted and described in further detail with respect to FIG. 4.

User device 110 further includes user interface 112 and application 114. User interface 112 is a program that provides an interface between a user of an end user device, such as user device 110, and a plurality of applications that reside on the device (e.g., application 114). A user interface, such as user interface 112, refers to the information (such as graphic, text, and sound) that a program presents to a user, and the control sequences the user employs to control the program. A variety of types of user interfaces exist. In one embodiment, user interface 112 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 112 is a script or application programming interface (API). In an embodiment, user interface 112 displays one or more records or intersecting matches between one or more records.

Application 114 can be representative of one or more applications (e.g., an application suite) that operate on user device 110. In an embodiment, application 114 is representative of one or more applications (e.g., record applications and database applications located on user device 110). In various example embodiments, application 114 can be an application that a user of user device 110 utilizes to securely find matching records between multiple, individually owned private datasets. In an embodiment, application 114 can be a client-side application associated with a server-side application running on server 120 (e.g., a client-side application associated with of shingle weighting program 101). In an embodiment, application 114 can operate to perform processing steps of shingle weighting program 101 (i.e., application 114 can be representative of shingle weighting program 101 operating on user device 110).

Server 120 is configured to provide resources to various computing devices, such as user device 110. For example, server 120 may host various resources, such of shingle weighting program 101 that are accessed and utilized by a plurality of devices. In various embodiments, server 120 is a computing device that can be a standalone device, a management server, a web server, an application server, a mobile device, or any other electronic device or computing system capable of receiving, sending, and processing data. In an embodiment, server 120 represents a server computing system utilizing multiple computers as a server system, such as in a cloud computing environment. In an embodiment, server 120 represents a computing system utilizing clustered computers and components (e.g., database server computer, application server computer, web server computer, webmail server computer, media server computer, etc.) that act as a single pool of seamless resources when accessed within network computing environment 100. In general, server 120 represents any programmable electronic device or combination of programmable electronic devices capable of executing machine readable program instructions and communicating with each other, as well as with user device 110, storage device 130, and other computing devices (not shown) within network computing environment 100 via a network, such as network 140.

In an embodiment, there are two or more servers connected via network 140. In an embodiment, the LSH protocol is carried out by the two interacting parties, each with its own separate server, storage device, and access to shingle weighting program 101. For example, intersecting party Alice is associated with database A running on server A and intersecting party Bob is associated with database B running on server B, all interconnected over network 140.

Figure 4:
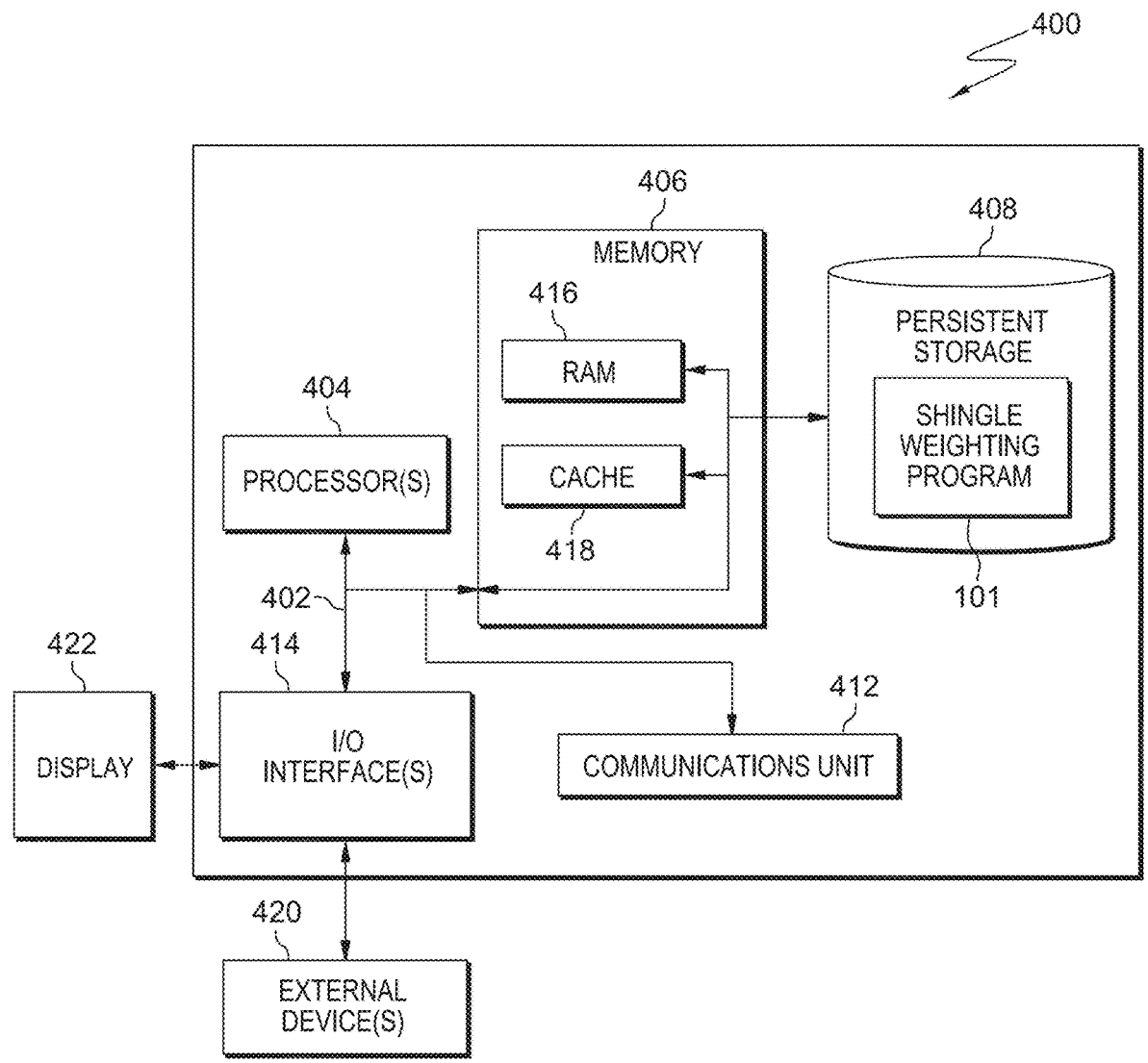
FIG. 4 is a block diagram depicting components of a computer, generally designated 400, suitable for executing a shingle weighting program 101 in accordance with at least one embodiment of the present invention.
Figure 5:
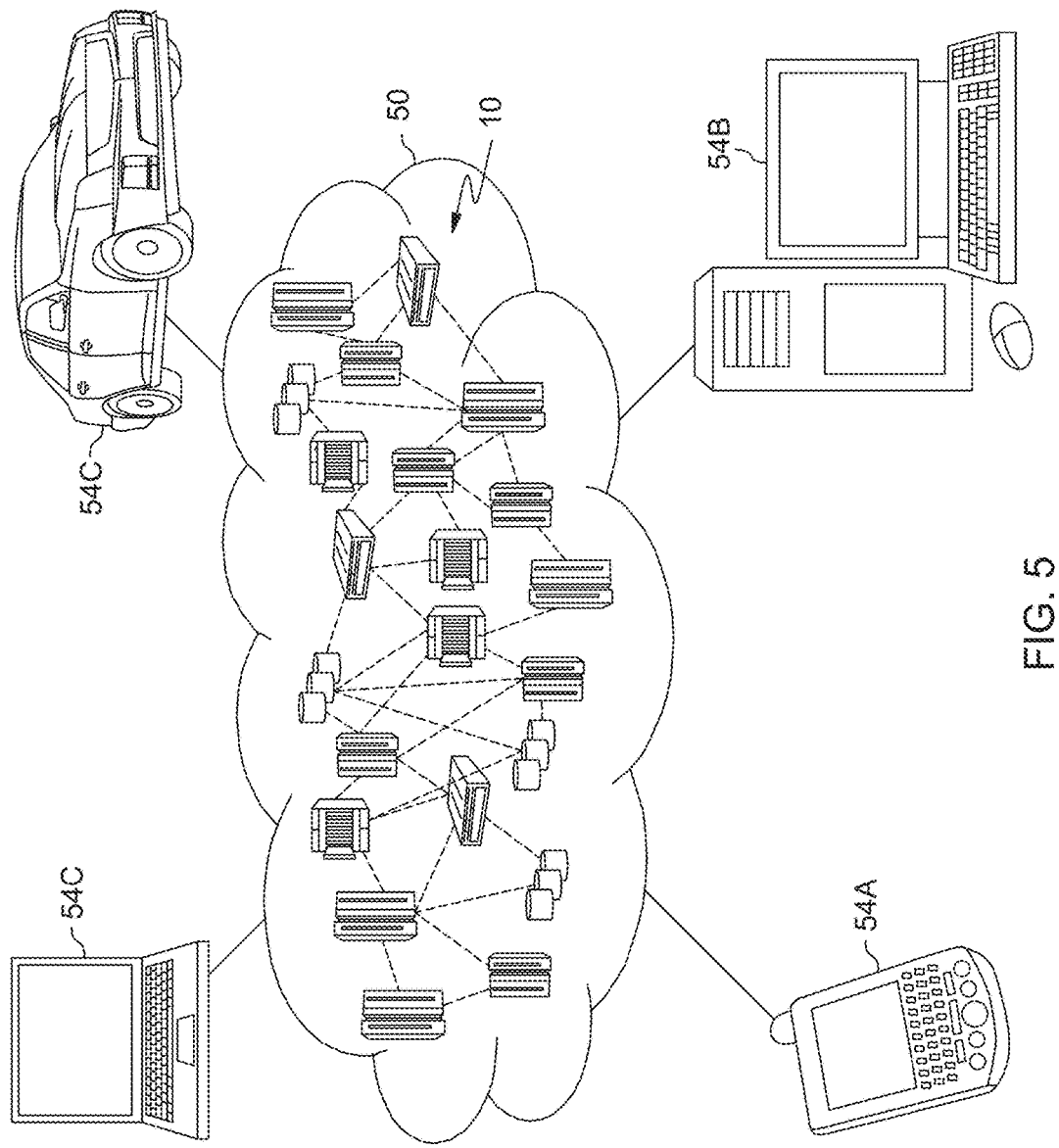
FIG. 5 is a block diagram depicting a cloud computing environment 50 in accordance with at least one embodiment of the present invention.

Server 120 may include components as depicted and described in detail with respect to cloud computing node 10, as described in reference to FIG. 5, in accordance with at least one embodiment of the present invention. Server 120 may include components, as depicted and described in detail with respect to computing device 400 of FIG. 4, in accordance with at least one embodiment of the present invention.

In an embodiment, server 120 includes shingle weighting program 101. In an embodiment, shingle weighting program 101 may be configured to access various data sources, such as the data record database 132 that may include personal data, content, contextual data, or information that a user does not want to be processed. Personal data includes personally identifying information or sensitive personal information as well as user information, such as location tracking or geo-location information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In an embodiment, shingle weighting program 101 enables the authorized and secure processing of personal data. In an embodiment, shingle weighting program 101 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In an embodiment, shingle weighting program 101 provides information regarding personal data and the nature (e.g., type, scope, purpose, duration, etc.) of the processing. In an embodiment, shingle weighting program 101 provides a user with copies of stored personal data. In an embodiment, shingle weighting program 101 allows for the correction or completion of incorrect or incomplete personal data. In an embodiment, shingle weighting program 101 allows for the immediate deletion of personal data.

In various embodiments, storage device 130 is a secure data repository for persistently storing data record database 132 utilized by various applications and user devices of a user, such as user device 110. Storage device 130 may be implemented using any volatile or non-volatile storage media known in the art for storing data. For example, storage device 130 may be implemented with a tape library, optical library, one or more independent hard disk drives, multiple hard disk drives in a redundant array of independent disks (RAID), solid-state drives (SSD), random-access memory (RAM), and any possible combination thereof. Similarly, storage device 130 may be implemented with any suitable storage architecture known in the art, such as a relational database, an object-oriented database, or one or more tables.

In an embodiment, storage device 130 includes data record database 132. In an embodiment, data record database 132 includes information relating to one or more data records or data sets. In an embodiment, data record database 132 includes information associated with intersecting data records (i.e., two or more data records that have a similarity score above a predetermined threshold) between data sets. For example, if shingle weighting program 101 determines that Data Record A from Data Set 1 and Data Record C from Data Set 2 have a similarity score above a predetermined threshold, the similarly score associated with the two data records, and optionally the two records themselves, are stored in data record database 132. In an embodiment, data record database 132 includes the number of intersecting data records between data sets, and the intersecting data records themselves. In another example, if shingle weighting program 101 determines that four data records from Data Set C intersect (i.e., have a similarity score above a predetermined) with four data records from Data. Set D, shingle weighting program 101 stores information in data record database 132 associated with the number of intersecting records between Data Set C and Data Set D, and optionally the intersecting records themselves. In an embodiment, data record database 132 includes information associated with one or more shingle weights. For example, if shingle weighting program 101 determines a shingle weight is SW1=1, this information is stored in data record database 132. In an embodiment, data record database 132 stores information for one or more determined max hash. A max hash is the maximum value hash(x) can return or the highest hash value from all determined hash values. In another example, if shingle weighting program 101 determines the max hash for shingle SHA-256 is 2^256 hashes, this information is stored in data record database 132.

In an embodiment, two or more storage devices 130 are connected over network 140. In an embodiment, two matching records belong to separate parties and are stored in two separate record databases corresponding to two separate storage devices 130. For example, even if party A learns that party B's database has a matching record, then party A does not have access to the matching record of B. Party A only learns which of its own records have matches in B's database.

In an embodiment, shingle weighting program 101 performs preprocessing on each data set. Preprocessing is the manipulation or dropping of data before it is used in order to ensure or enhance performance. Data preprocessing may be divided into four stages: data cleaning, data integration, data reduction, and data transformation. Data cleaning refers to techniques to 'clean' data by removing outliers, replacing missing values, smoothing noisy data, and correcting inconsistent data. Data integration removes redundant or inconsistent data. Data reduction includes condensing the data set that is smaller in volume, while maintaining the integrity of the original data set. Data transformation includes transforming the data into a form appropriate for data modeling.

In an embodiment, preprocessing includes joining fields. For example, only relatively unique fields are kept, while ordinary fields that are found in many records are removed. In an embodiment, a canonicalization process is performed on the data sets to convert the data sets into a standard, common form. For example, converting data to lower-case, removing non-alphanumeric characters and superfluous white spaces, and other canonicalization techniques.

In an embodiment, shingle weighting program 101 determines cyclic shingles for each data set. Shingles are substrings of fixed length extracted from the concatenated fields of the record. For example, cyclic shingles include a predetermined number of characters at the end of the string, followed by a predetermined number of characters found at the beginning of the string. Cyclic shingles start near the end of the concatenated fields and cycle back to the beginning. For example, if the concatenated fields are the string "John Doe Sunset Street 7034 Los Angeles", then "eet 70" is a 6-character shingle, and "elesJo" is a 6-character cyclic shingle. The computation of a shingle set can be performed, for example, by extracting the k-shingles from the data string, after concatenating the first k−1 letters of the string to its end, where k is the desired shingle size. In an embodiment, the text string is broken into a set of overlapping substrings of size k called shingles, i.e., every k consecutive characters in the string are an element in the set. In an embodiment, the similarity of two strings is measured in terms of shared shingles. In an embodiment, the "Jaccard similarity" of two strings is the size of the intersection divided by the size of the union of their respective sets of shingles.

In an embodiment, a Min-Hash of a string is computed by evaluating an underlying hash (e.g., SHA-256) over all the shingles of the string and returning the minimal resulting hash value. The application of a hash function to compute the min-hash value of a record involves evaluating the hash function over all the shingles of the record and returning the minimal result. This type of hash is called a MIN-HASH.

Using a different underlying hash (sometimes termed a permutation in this context) over the set of shingles would naturally result in a different Min-Hash result. It can be shown that in order to estimate the Jaccard similarity of two strings we can compute many Min-Hashes that use different underlying permutations over the two sets of shingles extracted from the pair of strings and measure the ratio of Min-Hashes that return the same values for the two strings. In practice, the number of permutations (P) used to estimate the Jaccard similarity are split into B "bands" of R permutations, where (P=B×R). The concatenation of the R Min-Hashes of each band is again hashed to produce the "signature" of the band (the same signature hash is common for all the bands). The tuple of B band signatures produced for the string is the LSH of the string. Two such LSHs are considered as "matching" if their tuples share a common band signature.

In an embodiment, shingle weighting program 101 converts a text string (e.g., a name, an address, or a phone number) into a set of shingles. In an embodiment, shingle weighting program 101 determines a weight for each shingle. In an embodiment, shingle weighting program 101 processes each shingle by determining the hash. In an embodiment, shingle weighting program 101 determines the maximum hash value or maxHash for a maximum number of hashes that can be returned (e.g., 2^256 for SHA-256). In an embodiment, shingle weighting program 101 divides a determined hash by the maxHash to determine a first intermediate value. In an embodiment, shingle weighting program 101 determines a second intermediate value by subtracting 1 minus the first intermediate value. In an embodiment, shingle weighting program 101 generates a third intermediate value. In an embodiment, shingle weighting program 101 determines a third intermediate value by raising the second intermediate value to the value of 1 divided by W. In an embodiment, shingle weighting program 101 determines a fourth intermediate value. In an embodiment, shingle weighting program 101 determines a fourth intermediate value by subtracting 1 minus the third intermediate value.

In an embodiment, shingle weighting program 101 further multiplies the second intermediate value by the maxHash to generate an optimal shingle weight for a shingle. In an embodiment, different weights are determined and applied to different shingles. For example, if a shingle weight of 2 is determined for shingle A, and a shingle weight of 1 is determined for shingle B, a shingle weight of 2 is applied to shingle A and shingle weight of 1 is applied to shingle B.

In an embodiment, shingle weighting program 101 applies a plurality of different hashing functions to each record of a dataset to generate a plurality of min-hash values for each record of the dataset. For example, shingle weighting program 101 applies one-hundred different hashing functions to Record A of Data Set 1, which thereby generates one-hundred different min-hash values for Record A. Shingle weighting program 101 may then apply the same one-hundred different hashing functions to all of the Records included in Dataset 1 (e.g., Record B, Record C . . . Record N). Thus, evaluating the hash function over all the shingles of the record and returning the minimum result.

In an embodiment, shingle weighting program 101 groups the min-hash values for the record into b "bands" of r min-hashes in each band. For example, if 100 min-hashes are computed for the record, then they may be grouped into b=20 bands of r=5 min-hashes per band. In an embodiment, shingle weighting program 101 takes these r min-hash values of a band and hashes them into a respective band signature. In an embodiment, shingle weighting program 101 repeats this process b times to produce b signatures. The resulting tuple of b signatures is the LSH of the record. Two records are considered "similar" if they share at least one of their b signatures.

If at least one of the b signatures is shared between the two LSHs then a possible match is declared. The probability that this is indeed a true match increases if there are more than just the one required shared band—the more shared bands out of the total b bands—the higher the probability that the match estimate is correct. In addition, if b is configured to be smaller, then the fact that there is even just a single shared band is more significant. Thus, having a single shared band when b is set to be small indicates a higher probability that the match is true than if the single shared band is one of many bands. For example, 1 shared band out of b=4 bands indicates a much higher probability of similarity than one shared band out of b=400 bands. Also, two shared bands out of b=4 bands indicates a higher probability of similarity than just one shared band out of b=4 bands.

In an embodiment, shingle weighting program 101 performs PSI over the respective sets of band signatures of the LSH values. A pair of records with no matching LSH are non-identical and are also likely non-matching.

In an embodiment, shingle weighting program 101 determines a Jaccard similarity coefficient to determine if there is a match between at least two data records. The Jaccard index, also known as the Jaccard similarity coefficient, is a statistic used for gauging the similarity and diversity of sample sets. The Jaccard index can be determined by the following equation:

$$J(A, B) = \frac{|A \cap B|}{|A \cup B|} = \frac{|A \cap B|}{|A| + |B| - |A \cap B|}.$$

J is the Jaccard distance. In an embodiment, A is the set of shingles of record A from first data set, and B is the set of shingles of record B from the second data set. In an embodiment, there is a probability that a pair A and B with a small Jaccard (A,B) would still be matched by having a shared band signature (thus resulting in a possible false positive). In an embodiment, the Jaccard threshold (JT) is selected based on user input. In an embodiment, match control is when a user selects a Jaccard threshold (JT). For example, the user determines a Jaccard threshold (JT) and a probability P, a "separation" S and small epsilon. This creates the following: a pair A,B with Jaccard(A,B)>JT will be matched with probability>P, and a pair A,B with Jaccard (A,B)<JT-S will be matched with probability<epsilon.

For example, the probability that two strings A and B will be paired as a result of the above procedure is 1−(1−Jaccard (A,B)^r)^b. Match control can be achieved via a correct setting of r and b. Fine tuning r and b can increase the accuracy of the scheme in detecting matches that are similar beyond some desired Jaccard threshold with some desired probability.

In an embodiment, shingle weighting program 101 is used for two or more parties or users. Each party or user generates a separate collection N of hashes from its own records. Then, each of the N collections of hashes is passed between all the members, and each member applies its hash algorithms to each of the hashes. Identifiers of members who already applied their secret key to a collection is attached to it. Once a collection is signed by N members, it is distributed by the last signing member to the other members, so that each member has N collections, each signed by N members. Finally, each member searches for the band signatures that occur in all the N collections, to deduce the matching LSHs and hence the similar records.

In an embodiment, the user configures the rules by which two records are considered as match candidates. For each field in the database, records can be considered as matching if the record field (e.g. an SSN field) contains the exact same value for both. Alternately, records can be considered as candidates if the field (e.g. a home address field) contains a similar value. For fields that are measured by similarity, the user can configure a set of weights to differentiate the amount of influence each field will have in the total calculation of similarity. The user can divide the fields to groups and apply a rule or weight to the entire group. The rules can be ordered in the order in which they are to be applied. Rules that are fast to apply (e.g. just PSI with identical field checks) are applied first, so that the resulting candidates are not considered during the application of the latter more costly rules (that may require many band computations for similarity checks).

In an embodiment, shingle weighting program 101 first applies a screen candidate with the exact value in the fields marked to be screened by that rule (e.g. an SSN field). In an embodiment, shingle weighting program 101 applies one or more hash algorithms on the field or group of fields to produce the min-hashes and the band signatures and uses PSI based on Diffie-Hellman to find records of the other party with the same band-signature values. Diffie-Hellman key exchange is a method of securely exchanging cryptographic keys over a public channel. After identifying matching records by the first rule, shingle weighting program 101 removes these matching records from the database and uses similarity based private set intersection to identify the remaining candidate records by the second rule. In an embodiment, Diffie-Hellman is used to perform PSI, however, it should be appreciated any known methods of PSI may be performed.

In an embodiment, shingle weighting program 101 generates hash values to determine string similarity. In an embodiment, shingle weighting program 101 converts a first text string of a first data set into a first set of shingles. In an embodiment, converting the text string into the set of shingles includes dividing the first text string into a set of overlapping substrings having a fixed number of consecutive characters, wherein a total number of shingles in the first set of shingles is determined by a total number of different possible combinations overlapping substrings having the fixed number of consecutive characters. In an embodiment, shingle weighting program 101 determines a weight associated with each shingle in the first set of shingles based, at least in part, on a particular record field associated with a shingle. In an embodiment, shingle weighting program 101 generates, based on a hash function, a hash value for each shingle in the first set of shingles. In an embodiment, shingle weighting program 101 reduces the hash value generated for each shingle in the first set of shingles, based, at least in part on the weight associated with the shingle.

In an embodiment, reducing the hash value generated for each shingle in the first set of shingles is further based, at least in part on generating a first intermediate value by dividing the hash value generated for the shingle by a maximum hash value, generating a second intermediate value by calculating 1 minus the first intermediate value raised to the weight associated with the shingle, generating a third intermediate value by multiplying the second intermediate value by the weight associated with the shingle, and reducing the hash value generated for the shingle based on the third intermediate value. In an embodiment, reducing the hash value generated for the shingle increases as the weight associated with the shingle increases. In an embodiment, reducing the hash value generated for the shingle decreases as the weight associated with the shingle increases. In an embodiment, reducing the hash value of each shingle in the first set of shingles according to the weight associated with the shingle directly increases a likelihood of a shingle with a higher weight ending up with a minimum hash value. In an embodiment, shingle weighting program 101 computes a hash-based signature for the shingle having a minimum hash value.

In an embodiment, shingle weighting program 101 determines that the first text string from the first data set and a second text string from a second data set intersect based, at least in part, the first text string and the second text string sharing the hash-based signature. In an embodiment, shingle weighting program 101 determines that the first text string from the first data set and the second text string from the second data set are a match based, at least in part, on a similarity score associated with the first and second text strings being above a predetermined threshold. In an embodiment, shingle weighting program 101 determines that the first text string from the first data set and the second text string from the second data set are a match is further based, at least in part, on a Jaccard similarity being above a predetermined threshold.

Figure 2:
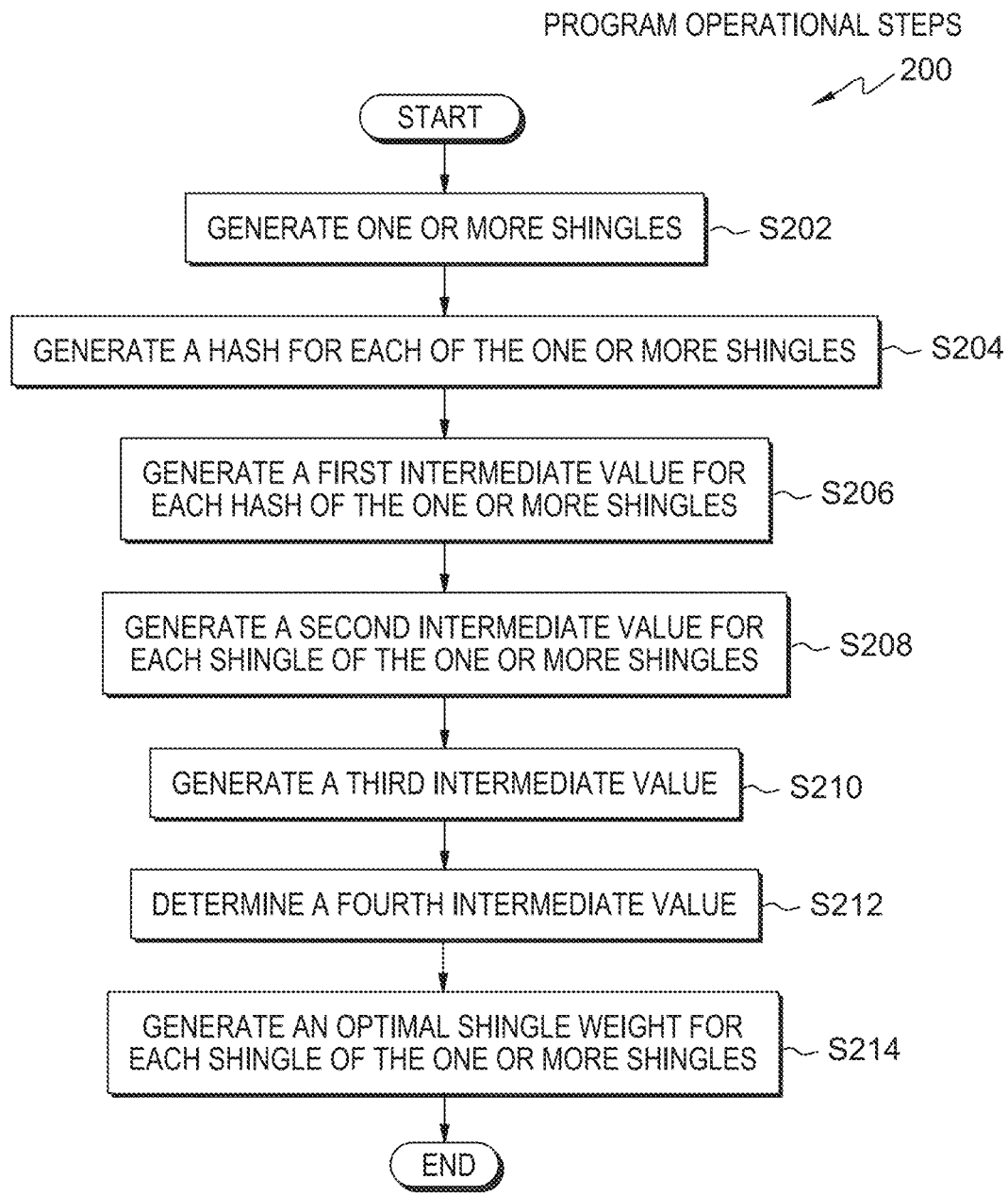
FIG. 2 is a flow chart diagram depicting operational steps for shingle weighting program 101, generally designated 200, in accordance with at least one embodiment of the present invention.

FIG. 2 is a flow chart diagram depicting operational steps for reducing a shingle value according to weight, generally designated 200, in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

At step S202, shingle weighting program 101 generates one or more shingles. In an alternative embodiment, at step S202, shingle weighting program 101 identifies one or more shingles.

At step S204, shingle weighting program 101 generates a hash for each of the one or more shingles. In an alternative embodiment, at step S204, shingle weighting program 101 identifies a hash for each of the one or more shingles.

At step S206, shingle weighting program 101 generates a first intermediate value for each hash of the one or more shingles. In an embodiment, the first intermediate value for a hash is generated based, at least in part, by dividing the hash by the maxHash.

At step S208, shingle weighting program 101 generates a second intermediate value for each shingle of the one or more shingles. In an embodiment, shingle weighting program 101 determines a second intermediate value by subtracting 1 minus the first intermediate value.

At step S210, shingle weighting program 101 generates a third intermediate value. In an embodiment, shingle weighting program 101 determines a third intermediate value by raising the second intermediate value to the value of 1 divided by W.

At step S212, shingle weighting program 101, determines a fourth intermediate value. In an embodiment, shingle weighting program 101 determines a fourth intermediate value by subtracting 1 minus the third intermediate value.

At step S214, shingle weighting program 101 generates an optimal shingle weight for each shingle of the one or more shingles. In an embodiment, the optimal shingle weight of a shingle is determined based, at least in, part on the first intermediate value, the second intermediate value, the third intermediate value, and the fourth intermediate value. In an embodiment, the optimal shingle weight for a shingle is determined based, at least in part, by multiplying the fourth intermediate value by the maxHash.

Figure 3:
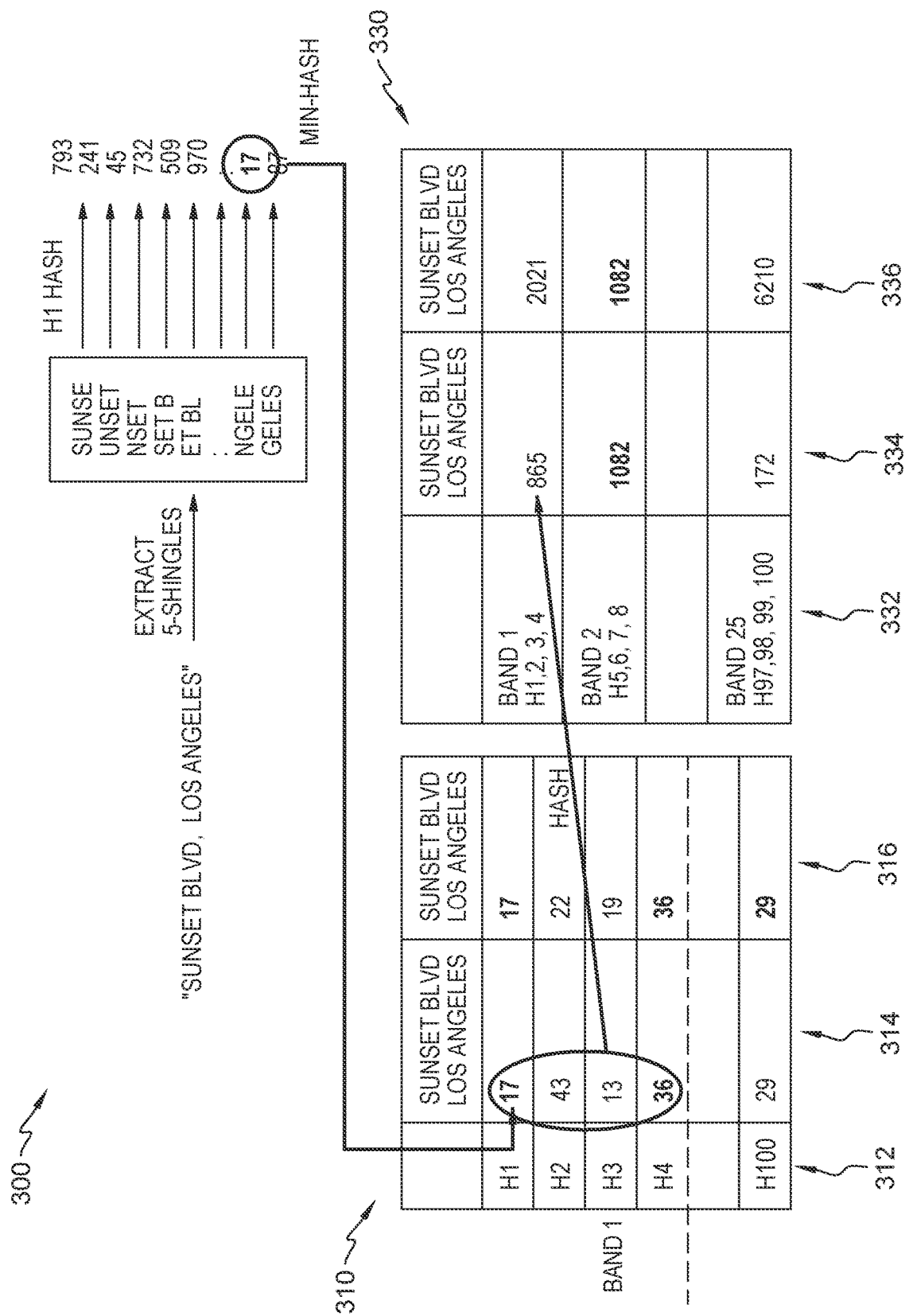
FIG. 3 depicts various table data generated for determining one or more optimal shingle weights, generally designated 300, in accordance with at least one embodiment of the present invention.

FIG. 3 depicts various table data generated for determining one or more optimal shingle weights, generally designated 300, in accordance with at least one embodiment of the present invention. Table 310 depicts a set of min-hash values generated for sets of shingles corresponding to respective data strings (shown in the column headers). In an embodiment, shingle weighting program 101 identifies a string and converts the string into a set of shingles. As depicted in FIG. 3, the strings are address and each address is converted into a set of shingles. The hash functions generated for the set of shingles are depicted in column 312. Min-Hash values for string A "SUNSET BLVD LOS ANGELES" taken from a record from data set A from company A are depicted in column 314 and hash values for string B "SUNSET BLVD LA" taken from a record from data set B from company B are depicted in column 316. As further depicted in FIG. 3, shingle weighting program 101 uses hash function H1 to compute H1 (shingle) on all the shingles of string A and records the minimum result (17 in this case as shown). In an embodiment, shingle weighting program 101 generates a first intermediate value by dividing a determined hash by the maxHash. In an embodiment, shingle weighting program 101 generates the first intermediate value by dividing H1 by the maxHash. As further depicted in FIG. 3, dividing the value of H1, here 17, by the maxHash, here 43, results in a first intermediate value of 0.3953. In an embodiment, shingle weighting program 101 generates a second intermediate value by computing $1-(1-\text{first intermediate value})^{(1/W)}$, wherein W is the weight. Here, shingle weighting program 101 generates a second intermediate value by computing $1-(1-0.3953)^{(1/W)}$. In an embodiment, shingle weighting program 101 generates an optimal shingle weight by multiplying the second intermediate value by the maxHash. In this example, this is repeated for 100 different hashes to receive 100 signatures per string.

In an embodiment, shingle weighting program 101 splits the 100 signatures into 25 bands of 4 signatures each. In an embodiment, data intersection program 101 groups the 100 min-hashes into 25 bands of 4 min-hash signatures for the record of string A and for the record of string B. Table 330 is a chart diagram depicting the band signatures that form the LSH for the compared pair of records. Table 330 depicts band column 332, the band signature for string A of record A from data set A from company A in column 334 and the band signature for string B of record B from data set B from company B in column 336. In an embodiment, shingle weighting program 101 uses a separate hash to hash the 4 signatures into different hash "buckets". Meaning, every original address string ends up in 25 different buckets (i.e. one bucket per band). Strings that end up in the same bucket in any of their 25 buckets are considered similar, and thus cause their source records to be matched by the PPRL process. As depicted in table 330, the strings in Band 2 are in the same bucket and are candidate matched entities.

FIG. 4 is a block diagram depicting components of a computing device, generally designated 400, suitable for shingle weighting program 101 in accordance with at least one embodiment of the invention. Computing device 400 includes one or more processor(s) 404 (including one or more computer processors), communications fabric 402, memory 406 including, RAM 416 and cache 418, persistent storage 408, which further includes shingle weighting program 101, communications unit 412, I/O interface(s) 414, display 422, and external device(s) 420. It should be appreciated that FIG. 4 provides only an illustration of one embodiment and does not imply any limitations with regard to the environments in which different embodiments may be implemented. Many modifications to the depicted environment may be made.

As depicted, computing device 400 operates over communications fabric 402, which provides communications between computer processor(s) 404, memory 406, persistent storage 408, communications unit 412, and input/output (I/O) interface(s) 414. Communications fabric 402 can be implemented with any architecture suitable for passing data or control information between processor(s) 404 (e.g., microprocessors, communications processors, and network processors), memory 406, external device(s) 420, and any other hardware components within a system. For example, communications fabric 402 can be implemented with one or more buses.

Memory 406 and persistent storage 408 are computer readable storage media. In the depicted embodiment, memory 406 includes random-access memory (RAM) 416 and cache 418. In general, memory 406 can include any suitable volatile or non-volatile computer readable storage media.

Program instructions for shingle weighting program 101 can be stored in persistent storage 408, or more generally, any computer readable storage media, for execution by one or more of the respective computer processor(s) 404 via one or more memories of memory 406. Persistent storage 408 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 can include one or more network interface cards. Communications unit 412 may provide communications through the use of either or both physical and wireless communications links. In the context of some embodiments of the present invention, the source of the various input data may be physically remote to computing device 400 such that the input data may be received, and the output similarly transmitted via communications unit 412.

I/O interface(s) 414 allows for input and output of data with other devices that may operate in conjunction with computing device 400. For example, I/O interface(s) 414 may provide a connection to external device(s) 420, which may be as a keyboard, keypad, a touch screen, or other suitable input devices. External device(s) 420 can also include portable computer readable storage media, for example thumb drives, portable optical or magnetic disks, and memory cards. Software and data used to practice embodiments of the present invention can be stored on such portable computer readable storage media and may be loaded onto persistent storage 408 via I/O interface(s) 414. I/O interface(s) 414 also can similarly connect to display 422. Display 422 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 5 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
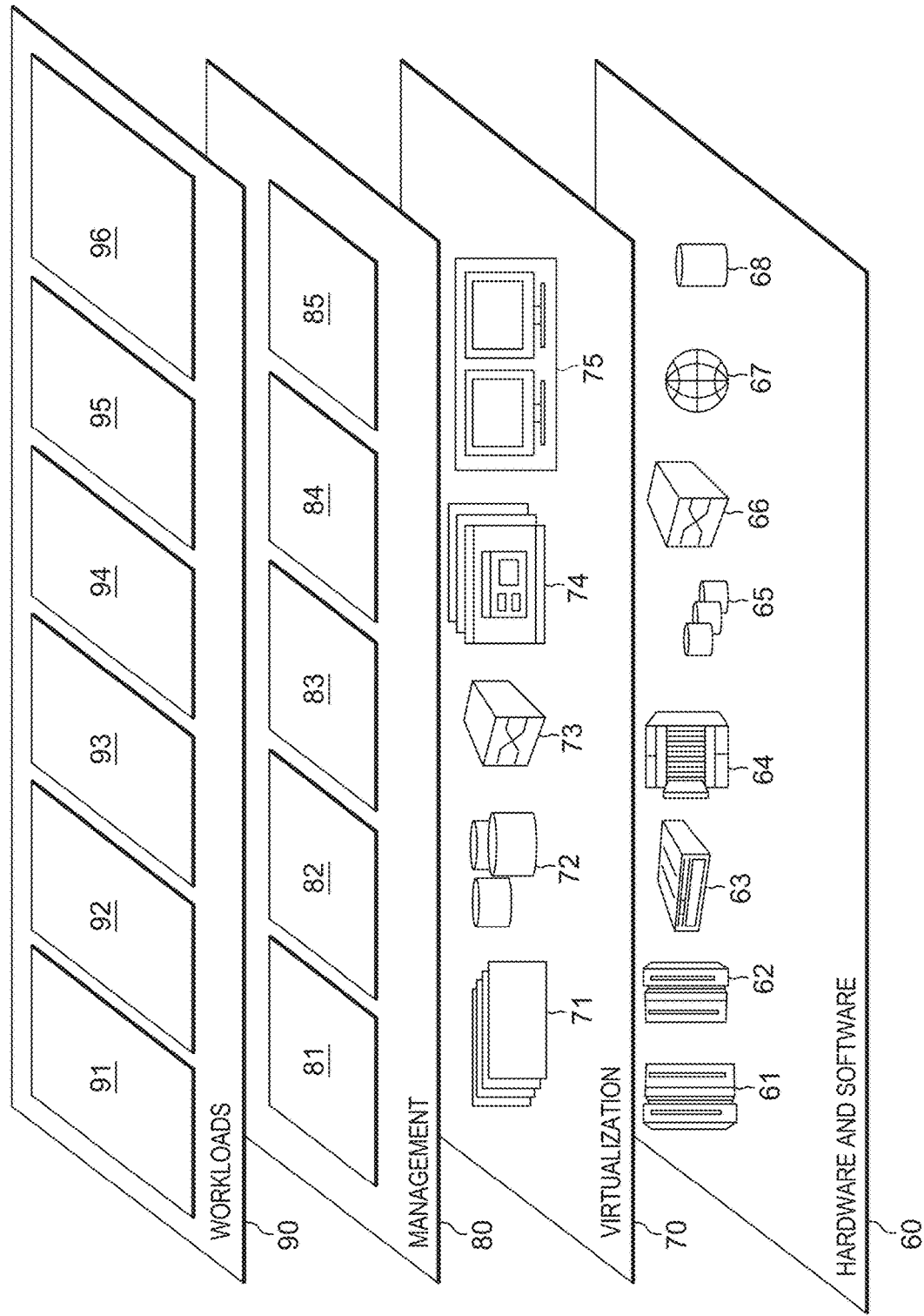
FIG. 6 is block diagram depicting a set of functional abstraction model layers provided by cloud computing environment 50 depicted in FIG. 5 in accordance with at least one embodiment of the present invention.

FIG. 6 is block diagram depicting a set of functional abstraction model layers provided by cloud computing environment 50 depicted in FIG. 5 in accordance with at least one embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and string similarity based weighted min-hashing 96.

What is claimed is:

1. A computer-implemented method for generating hash values to determine string similarity, the computer-implemented method comprising:
   converting a first text string of a first data set into a first set of shingles;
   determining a weight associated with each shingle in the first set of shingles, based, at least in part, on a particular record field associated with the shingle;
   generating, based on a hash function, a hash value for each shingle in the first set of shingles;
   reducing the hash value generated for each shingle in the first set of shingles, based, at least in part, on the weight associated with the shingle;
   computing a hash signature value using the reduced hash value;
   determining that two data records intersect according to the hash signature value; and
   storing information about the intersection over a network, in a record database.

2. The computer-implemented method of claim 1, wherein reducing the hash value generated for each shingle in the first set of shingles is further based on:
   generating a first intermediate value by dividing the hash value generated for the shingle by a maximum hash value;

generating a second intermediate value by calculating 1 minus the first intermediate value raised to the weight associated with the shingle;

generating a third intermediate value by multiplying the second intermediate value by the weight associated with the shingle; and reducing the hash value generated for the shingle based on the third intermediate value.

3. The computer-implemented method of claim 1, wherein a reduction in the hash value generated for the shingle increases as the weight associated with the shingle increases.

4. The computer-implemented method of claim 1, wherein a reduction in the hash value generated for the shingle decreases as the weight associated with the shingle increases.

5. The computer-implemented method of claim 1, wherein converting the text string into the set of shingles further includes:

dividing the first text string into a set of overlapping substrings having a fixed number of consecutive characters, wherein a total number of shingles in the first set of shingles is determined by a total number of different possible combinations overlapping substrings having the fixed number of consecutive characters.

6. The computer-implemented method of claim 1, wherein reducing the hash value of each shingle in the first set of shingles according to the weight associated with the shingle directly increases a likelihood of a shingle with a higher weight ending up with a minimum hash value.

7. The computer-implemented method of claim 1, further comprising:

computing a hash-based signature for the shingle having a minimum hash value.

8. The computer-implemented method of claim 7, further comprising:

determining that the first text string from the first data set and a second text string from a second data set intersect, based, at least in part, the first text string and the second text string sharing the hash-based signature.

9. The computer-implemented method of claim 8, further comprising:

determining that the first text string from the first data set and the second text string from the second data set are a match, based, at least in part, on a similarity score associated with the first and second text strings being above a predetermined threshold.

10. The computer-implemented method of claim 9, wherein determining that the first text string from the first data set and the second text string from the second data set are a match is further based, at least in part, on a Jaccard similarity being above a predetermined threshold.

11. A computer program product for generating hash values to determine string similarity, the computer program product comprising one or more computer readable storage media and program instructions stored on the one or more computer readable storage media, the program instructions including instructions, which when executed, cause one or more computer processors to preform functions to:

convert a first text string of a first data set into a first set of shingles;

determine a weight associated with each shingle in the first set of shingles, based, at least in part, on a particular record field associated with the shingle;

generate, based on a hash function, a hash value for each shingle in the first set of shingles;

reduce the hash value generated for each shingle in the first set of shingles, based, at least in part on the weight associated with the shingle;

compute a hash signature value using the reduced hash value;

determine that two data records intersect according to the hash signature value; and store information about the intersection over a network, in a record database.

12. The computer program product of claim 11, wherein the instructions to reduce the hash value generated for each shingle in the first set of shingles is further based on instructions to:

generate a first intermediate value by dividing the hash value generated for the shingle by a maximum hash value;

generate a second intermediate value by calculating 1 minus the first intermediate value raised to the weight associated with the shingle;

generate a third intermediate value by multiplying the second intermediate value by the weight associated with the shingle; and reduce the hash value generated for the shingle based on the third intermediate value.

13. The computer program product of claim 11, wherein a reduction in the hash value generated for the shingle increases as the weight associated with the shingle increases.

14. The computer program product of claim 11, wherein a reduction in the hash value generated for the shingle decreases as the weight associated with the shingle increases.

15. The computer program product of claim 11, wherein the instructions to convert the text string into the set of shingles further includes instructions to:

divide the first text string into a set of overlapping substrings having a fixed number of consecutive characters, wherein a total number of shingles in the first set of shingles is determined by a total number of different possible combinations overlapping substrings having the fixed number of consecutive characters.

16. The computer program product of claim 11, wherein reducing the hash value of each shingle in the first set of shingles according to the weight associated with the shingle directly increases a likelihood of a shingle with a higher weight ending up with a minimum hash value.

17. The computer program product of claim 11, further comprising instructions to:

compute a hash-based signature for the shingle having a minimum hash value; and determine that the first text string from the first data set and a second text string from a second data set intersect, based, at least in part, the first text string and the second text string sharing the hash-based signature.

18. The computer program product of claim 17, further comprising instructions to:

determine that the first text string from the first data set and the second text string from the second data set are a match, based, at least in part, on a similarity score associated with the first and second text strings being above a predetermined threshold.

19. A computer system for generating hash values to determine string similarity, comprising:

one or more computer processors;

one or more computer readable storage media;

computer program instructions;

the computer program instructions being stored on the one or more computer readable storage media for execution by the one or more computer processors; and the computer program instructions including instructions to:

convert a first text string of a first data set into a first set of shingles;

determine a weight associated with each shingle in the first set of shingles, based, at least in part, on a particular record field associated with the shingle;

generate, based on a hash function, a hash value for each shingle in the first set of shingles;

reduce the hash value generated for each shingle in the first set of shingles, based, at least in part on the weight associated with the shingle;

compute a hash signature value using the reduced hash value;

determine that two data records intersect according to the hash signature value; and store information about the intersection over a network, in a record database.

20. The computer system of claim 19, wherein the instructions to reduce the hash value generated for each shingle in the first set of shingles is further based on instructions to:

generate a first intermediate value by dividing the hash value generated for the shingle by a maximum hash value;

generate a second intermediate value by calculating 1 minus the first intermediate value raised to the weight associated with the shingle;

generate a third intermediate value by multiplying the second intermediate value by the weight associated with the shingle; and reduce the hash value generated for the shingle based on the third intermediate value.

\* \* \* \* \*